United States Patent [19]

Brandstetter

[11] Patent Number: 5,406,375
[45] Date of Patent: Apr. 11, 1995

[54] ANGULAR DISTORTION MEASUREMENTS BY MOIRE FRINGE PATTERNS

[75] Inventor: Robert W. Brandstetter, Levittown, N.Y.

[73] Assignee: Grumman Aerospace Corporation, Bethpage, N.Y.

[21] Appl. No.: 95,990

[22] Filed: Jul. 23, 1993

[51] Int. Cl.6 .............................................. G01B 9/00
[52] U.S. Cl. ......................................................... 356/124
[58] Field of Search ................ 356/124, 125, 126, 127

[56] References Cited

U.S. PATENT DOCUMENTS

| | | | |
|---|---|---|---|
| 1,590,532 | 6/1926 | Lenouvel | 356/124 |
| 4,386,849 | 6/1983 | Häeusler et al. | 356/124 |
| 4,429,992 | 2/1984 | Häusler et al. | 356/124 |
| 4,794,550 | 12/1988 | Greivenkamp | 356/374 |
| 5,062,705 | 11/1991 | Sato et al. | 356/124 |
| 5,243,542 | 9/1993 | Noguchi | 356/374 |

OTHER PUBLICATIONS

McGraw-Hill Encyclopedia of Science & Technology, vol. 11, 6th Ed. 1987, (no month) pp. 299–300.

Primary Examiner—Richard A. Rosenberger
Attorney, Agent, or Firm—Bacon & Thomas

[57] ABSTRACT

A process and apparatus for measuring angular distortion in an optical imaging system in order to provide a mapping that completely characterizes the distortion of the imaging system involves electronically capturing the image of a test pattern at the image plane of the imaging system, superposing a computer generated reference pattern on the test pattern, and measuring the deviation of the test pattern from the reference pattern at selected areas of the reference pattern.

12 Claims, 9 Drawing Sheets

ANGULAR DISTORTION MEASUREMENTS BY MOIRE FRINGE PATTERNS

BACKGROUND OF THE INVENTION

1. Field of the Invention

This invention relates to a method of measuring the geometric distortion of an optical imaging system.

2. Description of Related Art

In any application where a lens is used to image a scene onto a planar surface such as a ground glass screen or onto a photosensitive material such as film or a television camera vidicon, a certain amount of geometric distortion will exist. This distortion is not a problem in most applications where the viewed image is accepted subjectively by the viewer. Even when distortion is severe, as in wide angle or fish eye photographs, the viewer can adjust, and may even accept the distortion as desirable. However, in applications where the accuracy of the image can affect the accuracy of a process, such as in vision systems for manufacturing, photolithography, and numerical machining controls, distortion can create excessive inaccuracies or out of tolerance measurements.

A useful definition of the distortion of an optical imaging system is the departure of the system from ideal behavior. Ideally, a lens system should produce a unique image point corresponding to each object point, and every straight line in the object space should have a corresponding straight line image in the image space. When the conditions for such a colinear transformation are not met, the departures from that ideal behavior are termed aberrations.

Conventionally, to calculate this distortion requires a complete knowledge of the imaging system, i.e., the exact characteristics of the lens such as its modulation transfer function (MTF), focal length, and its alignment with the photosensitive image plane. These characteristics are difficult to quantify and when the lens and/or camera are changed, one has to repeat the necessary measurement or calculation steps in order to obtain a new measure of the system distortion. Such repetition is both costly and time consuming.

The normal approach is to use the longest possible focal length with the best known high quality lens and the resultant system performance using a grid pattern to measure the distortion. This technique is not only time consuming, but also inadequate for many applications. In many instances, quantitative distortion measurements are simply not readily obtainable and the analysis leaves too many questions relating to actual lens characteristics. It is generally impractical to scan the distorted grid pattern image in order to obtain a quantitative two-dimensional map of the distortions over the entire image, except for relatively large scale aberrations, because the variables required for the analysis cannot be determined with sufficient accuracy, and thus full automation of the distortion measurement process has not been adopted.

An improvement to the method of directly analyzing a grid pattern viewed through the imaging system is to view the grid pattern image through another grid pattern placed downstream of the lens being analyzed in order to obtain a Moiré pattern. The examination of the lens can be carried out using an analysis of the Moiré pattern observed.

The Moiré pattern contains fringes which are readily identifiable even where the line spacing is too small to be detected. If the repeat spacing of one grating differs even slightly from that of the other, a beat pattern will be observed when the lines of the two figures are crossed at zero angle. The beat spacing is inversely proportional to the difference in spacings of the two gratings.

While this type of conventional Moiré pattern analysis has the effect of amplifying small aberrations, making them easier to detect, the use of a second discrete grating or reference prevents one from measuring overall imaging system distortion. If the actual image plane is not used as the detection plane, inaccuracies will be contributed by the positioning of the detection plane relative to the imaging system or element being analyzed. Despite the improved accuracy, conventional Moiré pattern distortion measurement techniques continue to be, in practice, both costly and time consuming, and do not readily lend itself to automated quantitative analysis.

SUMMARY OF THE INVENTION

It accordingly an objective of the invention to provide a method and apparatus for measuring the overall distortion of an optical imaging system be measured in an efficient and expeditious manner.

It is a further objective of the invention to provide a method and apparatus system for measuring the overall distortion of an optical imaging system in which all image distortions are accounted for because the reference is computer generated and comparison takes place within the computer using the actual image plane, for example a video camera detection plane, is compared with the internal computer reference which is not subject to physical distortion and therefore any resulting error should be attributed to the detection plane.

It is yet another objective of the invention to provide a method and apparatus for measuring lens distortion in which a quantitative map of the distortions in the optical imaging system can be easily made without the need for diffraction gratings and associated optics.

These objectives are achieved by a method of measuring the angular distortion of an optical imaging system in which Moiré analysis is used in a unique way to completely characterize the angular distortion of the imaging system by performing the following steps:

(1) using the imaging system to view a repetitive line test pattern;

(2) storing electrical signals representing sectors of the field of view in predetermined areas in memory;

(3) superimposing electrical signals representing a reference pattern on each of the test areas to obtain a Moiré pattern;

(4) measuring differences in the respective electrical signals representing a spacing of the fringes of the Moiré pattern to obtain angular alignment between the test pattern and the reference pattern for a sector;

(5) measuring the differences for each remaining sector in order to create a quantitative map of the distortions contributed by the optical imaging system over the entire image plane.

In an especially advantageous embodiment of the invention, the stored image of the test pattern is gated by a computer or image processor to select a single curve, which is then edge transformed, replicated, and summed with the reference pattern. The resulting Moiré pattern is automatically analyzed by determining the Moiré fringe spacing, which is then converted to angular errors and stored with coordinates of the errors in a computer memory. The gate is then moved to the next line and the process is repeated until an entire region has been analyzed. The data can then be printed out as a distortion map of the imaging system.

The objectives of the invention are further achieved by providing apparatus for performing the method steps listed above, including a memory for storing an image of a test pattern obtained by the optical imaging system to be tested, the image being stored in the form of electrical signals, and means for quantitatively comparing the electrical signals representing the test pattern with a reference. The apparatus advantageously includes a means for gating the image to obtain single lines, and for replicating those lines to obtain a family of identical curves for comparison with a reference pattern.

Among the unique features of the invention are the ability to map out angular distortions of the imaging system at television rates, the ability to measure angular distortion in virtually any imaging system, from microscopic to telescopic, the fact that it does not require special camera systems and can be constructed or practiced using off-the-shelf hardware and software, and the ability to generate quantitative data without the need for extensive computations.

DETAILED DESCRIPTION OF THE PREFERRED EMBODIMENTS

It is to be understood that while the invention involves mathematical principles, the invention does not lie in the underlying mathematical principles, which are known, but rather in their application to the physical system, and in particular to the electronic processing of electrical signals whose levels and arrangement represent the intensities and arrangement of a physical object viewed through the physical system. All references herein to numerical values are therefore to be understood as referring to the values of electrical signals representing those values.

Figure 1:
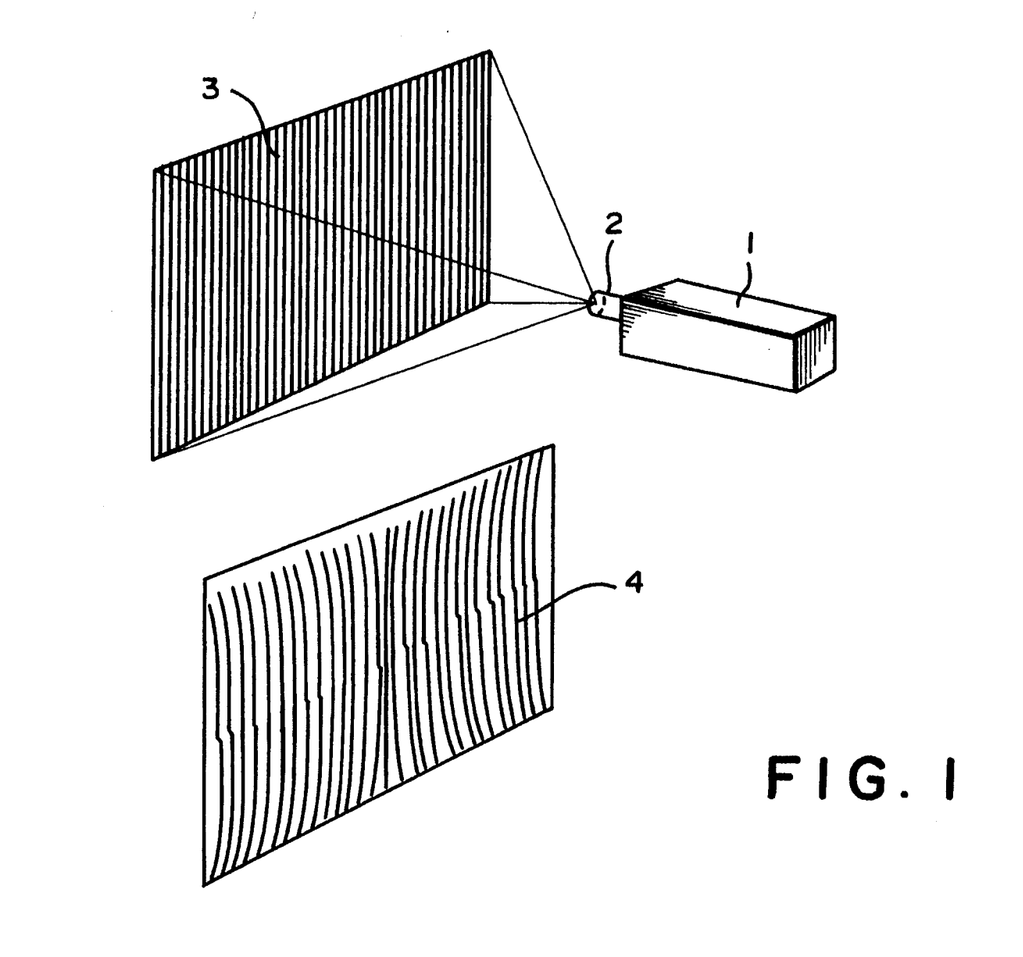
FIG. 1 is a schematic diagram of an optical imaging system whose distortion is to be measured by the apparatus and method of a preferred embodiment of the invention, and an input test pattern.
Figure 2:
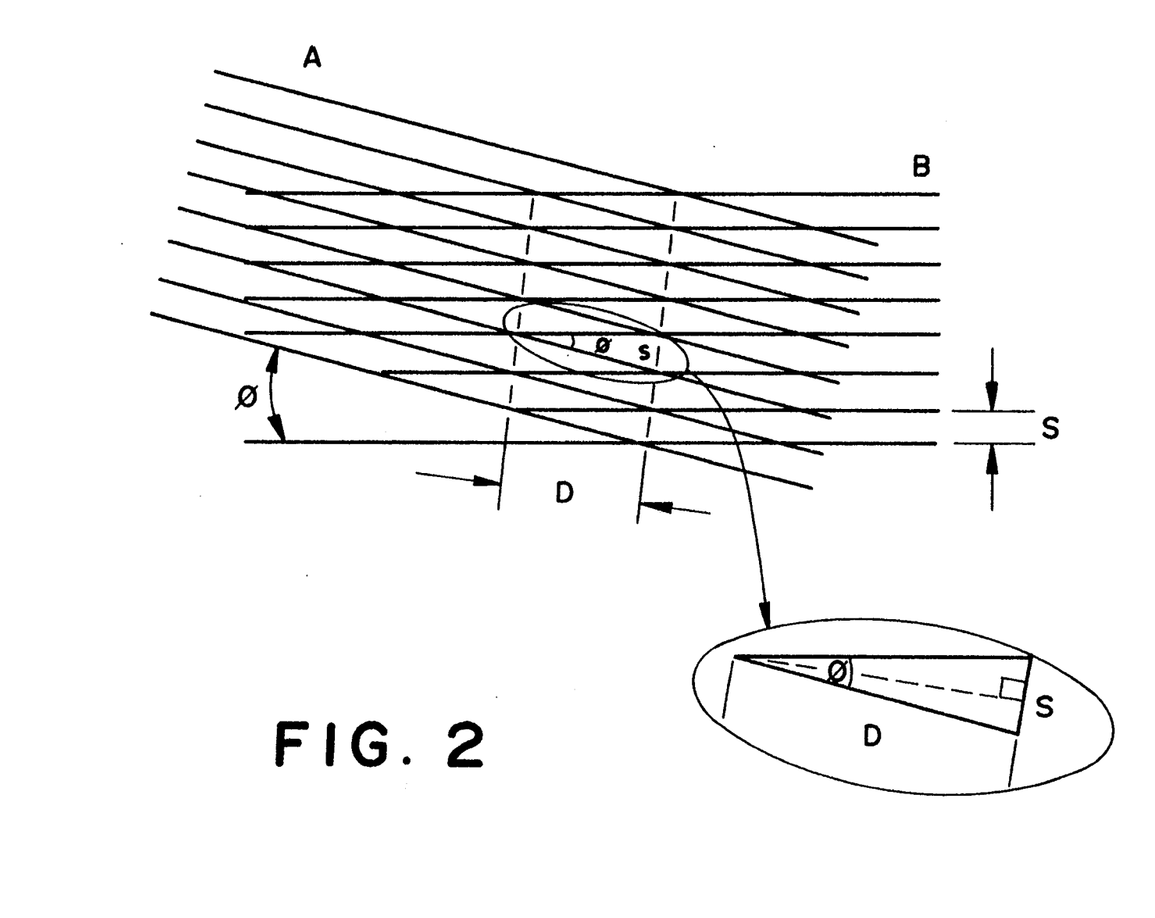
FIG. 2 is a schematic diagram illustrating the geometry of a Moiré pattern.
Figure 8:
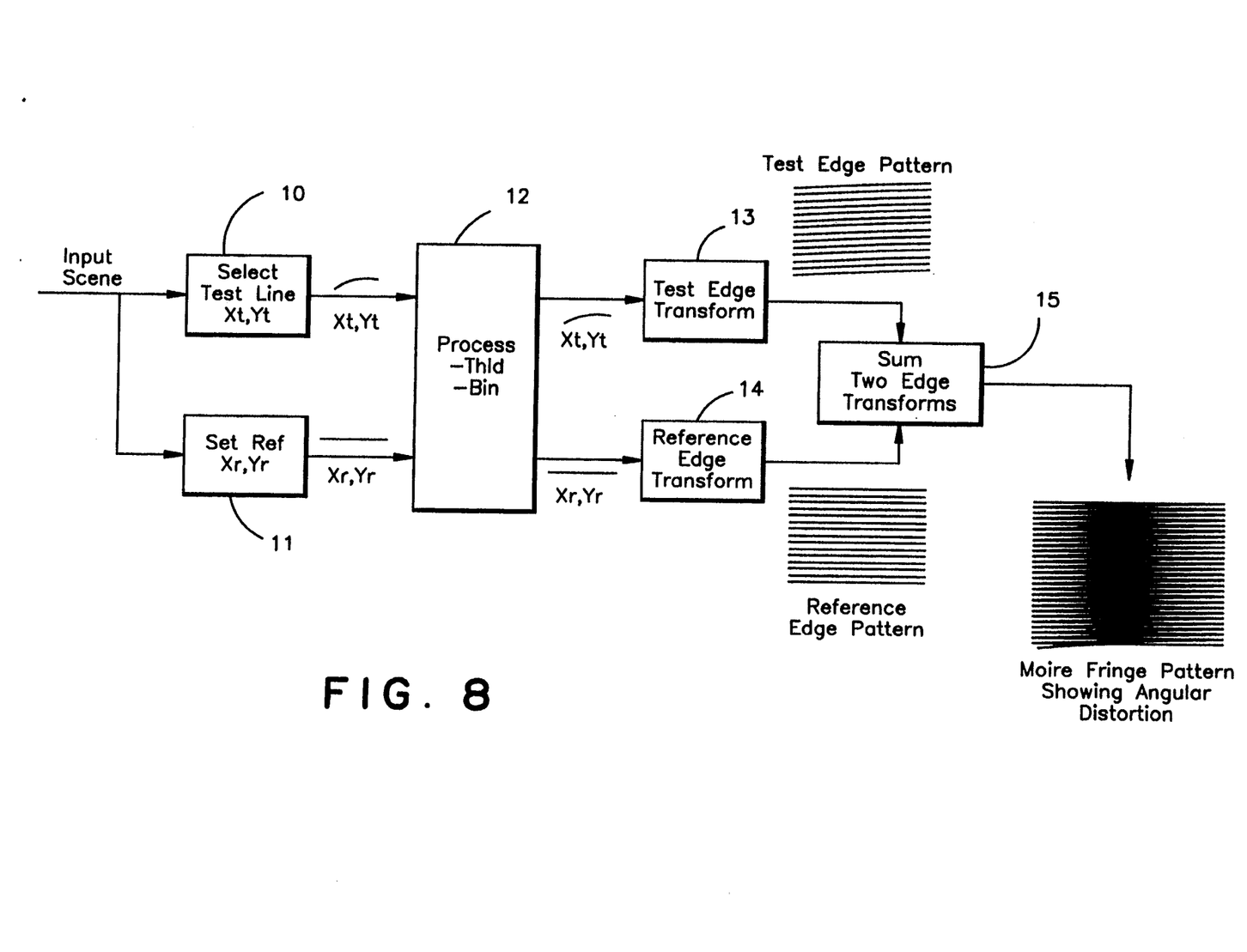
FIG. 8 is a block diagram illustrating the sequence of operations by which the distortion measurement is carded out by the preferred method and apparatus.

Referring to FIG. 1, the preferred embodiment of the invention provides a method and apparatus for analyzing the distortion in an imaging system 1, illustrated as a camera 1 with a lens 2. Of course, the imaging system could involve optical elements other than an imaging lens and camera optics. A test pattern in the form of a repetitive line pattern 3, which could be either vertical or horizontal, is input to the camera and the result is a test pattern image 4 on the image plane of the camera which incorporates the effects of the overall camera system distortions. The distorted image is converted into electronic form at an image plane by a charge-coupled device, or other device for converting optical signals into electrical signals, and then input to the processor functionally depicted in FIG. 8.

The general principles involved in quantitatively analyzing the test pattern 4 are as follows: When one line pattern is superimposed on a reference pattern, a Moiré fringe pattern will appear wherever the lines are not parallel. For each of these areas of intersecting lines, the difference in angular alignment of the patterns is given by the relationship:

$$D = \frac{S \cos\left(\frac{\phi}{2}\right)}{\sin \phi} \tag{1}$$

and for $\phi \to 0$, one can write $D = \frac{S}{\phi}$ where D is the width of the Moiré fringe spacing, s is the spacing between the lines of the two patterns, and $\phi$ is the angular difference between the reference and test lines. Thus, if s is known, $\phi$ can easily be determined since D will be relatively large.

Figure 5:
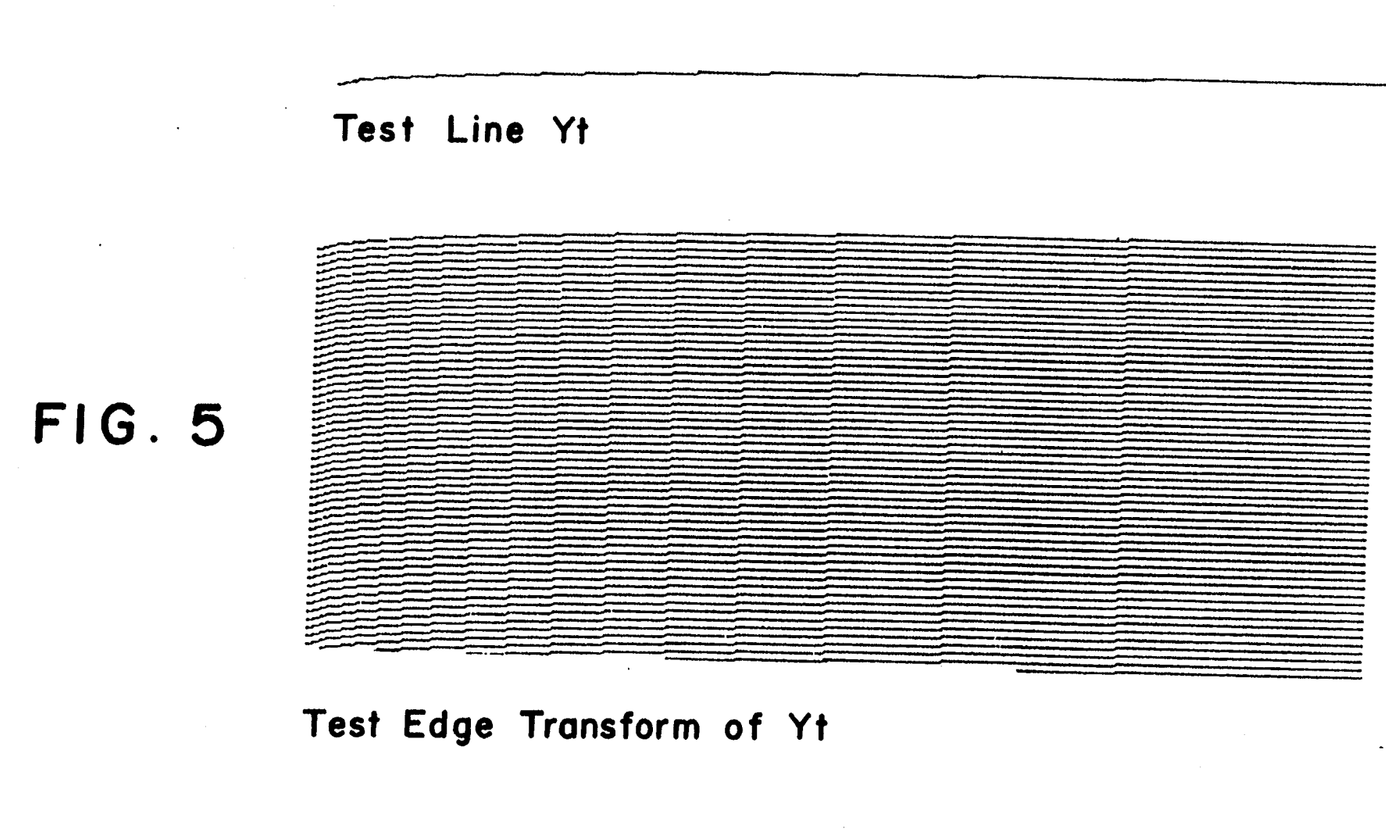
FIG. 5 is an illustration of a pseudo edge diffraction pattern for the test line shown in FIG. 3.

FIG. 5 illustrates the relationship between the reference and test patterns. Since the Moiré fringe pattern for a given set of conditions has a unique number of line crossovers for each value of angular deviation, the entire process can be implemented to function automatically by detecting the crossovers and relating these two specific angles, thus providing a mapping of angular distortion for each system under test.

While the above well-known formula (1) is useful, it could not previously be applied quantitatively to the general case where the line spacing is irregular due to distortions. The unique solution to this problem provided by the invention is to construct pseudo-line patterns for each line in the test pattern. This enables analysis to any desired accuracy using the above formula and greatly reduces the amount of processing required of the electronic test image.

Figure 3:
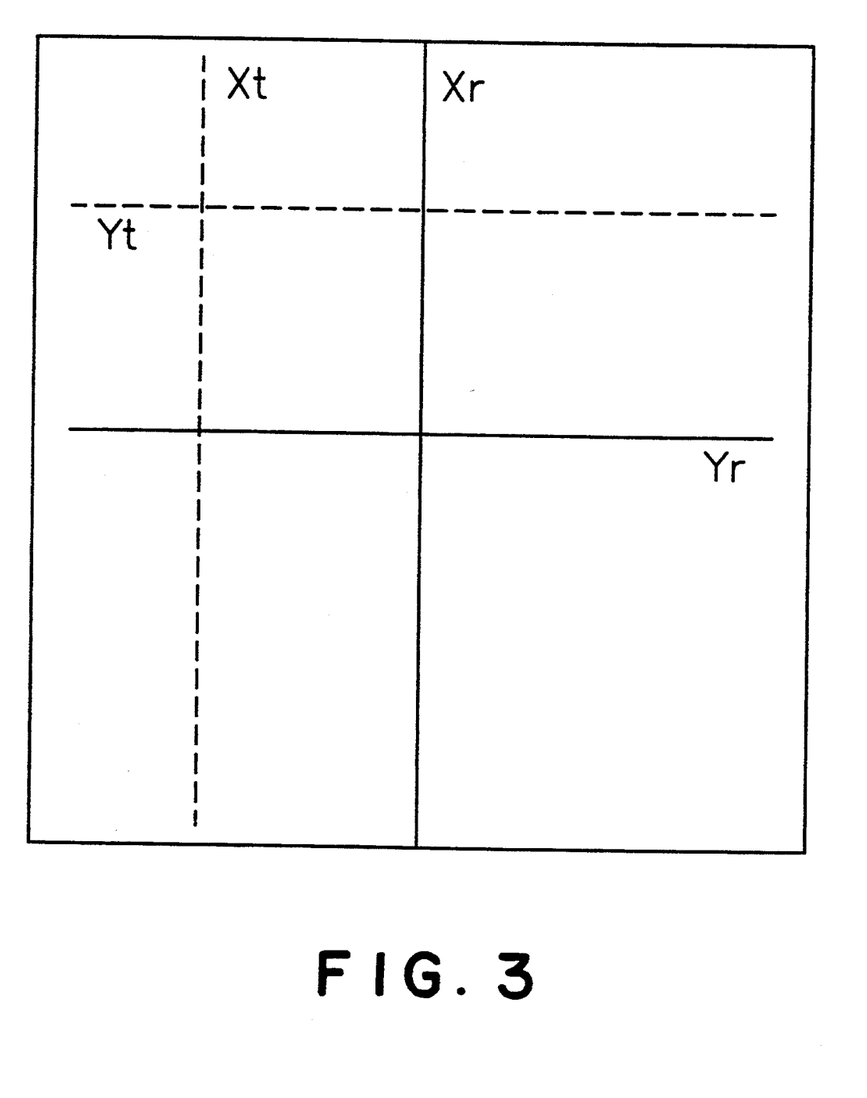
FIG. 3 is an illustration of the approach by which the selected line pattern X and Y axes are determined.

The preferred approach is to select a region X-Y of the image, as shown in FIG. 3, and determine $\Delta\phi$ for that region. Xr and Yr are selected reference axes at the center of the region and lines Xt and Yt are selected test lines at which the angular distortion is to be measured. In this approach, the entire field is used which permits greater accuracy since one can measure larger Moiré fringes as compared to a possible variation where reduced sectors only are used.

In the object plane, the X and Y components are set mutually perpendicular. Starting with Xr and Xt, both are viewed through the optical imaging system being tested resulting electrical signals representing the reference and test lines are processed by first thresholding them to remove unwanted background and then binarizing them to obtain a two state line video (on or off) for black or white with no gray scale. These operations are well-known to those skilled in the art and can be accomplished by using IMAGE software developed by NIH, which is in the public domain.

Figure 4:
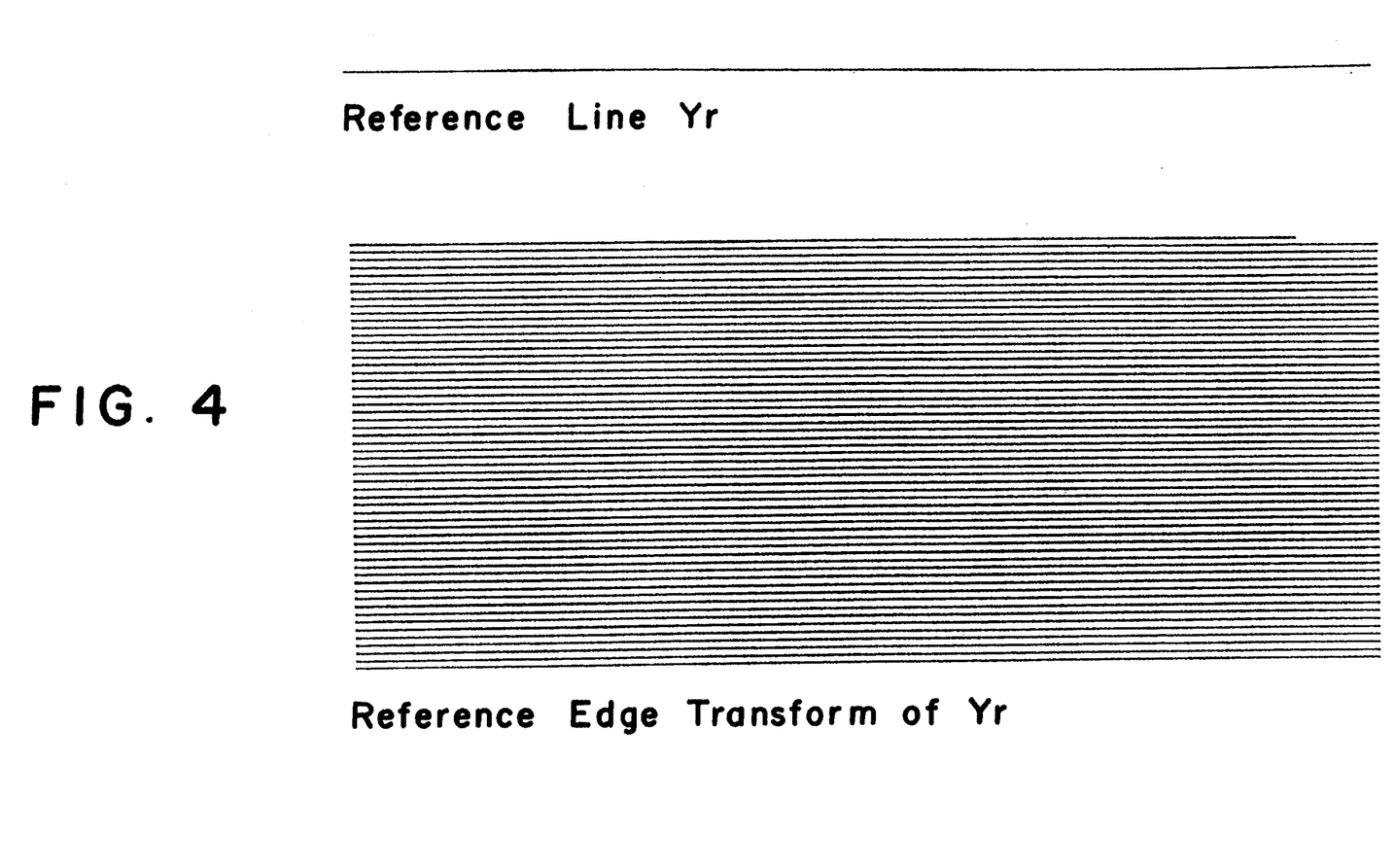
FIG. 4 is an illustration of a pseudo edge diffraction pattern for the reference line shown in FIG. 3.

The processing software then replicates the reference and test lines for both X and Y to form two pseudo edge diffraction patterns by replicating the lines at a known spacing s. Replication of the reference line is shown in FIG. 4, and replication of the test line as illustrated in FIG. 5. This can be accomplished by using IMAGE software developed by NIH, which is in the public domain, or for example using MATLAB adapting the following algorithm for replicating a line in a 128×128 pixel field:

```
Begin
x=zeros(128)
x (1:1, 1:128)=ones (1, 128)
x=fft (x)
Xs=fftshift(X)
Xas=abs(X)
d=Xas−1
sig=sign(d)
S=½* (sig+1)
End
``` where fft is a fast Fourier transform and sign(d) binarizes the resulting power spectrum.

Figure 6:
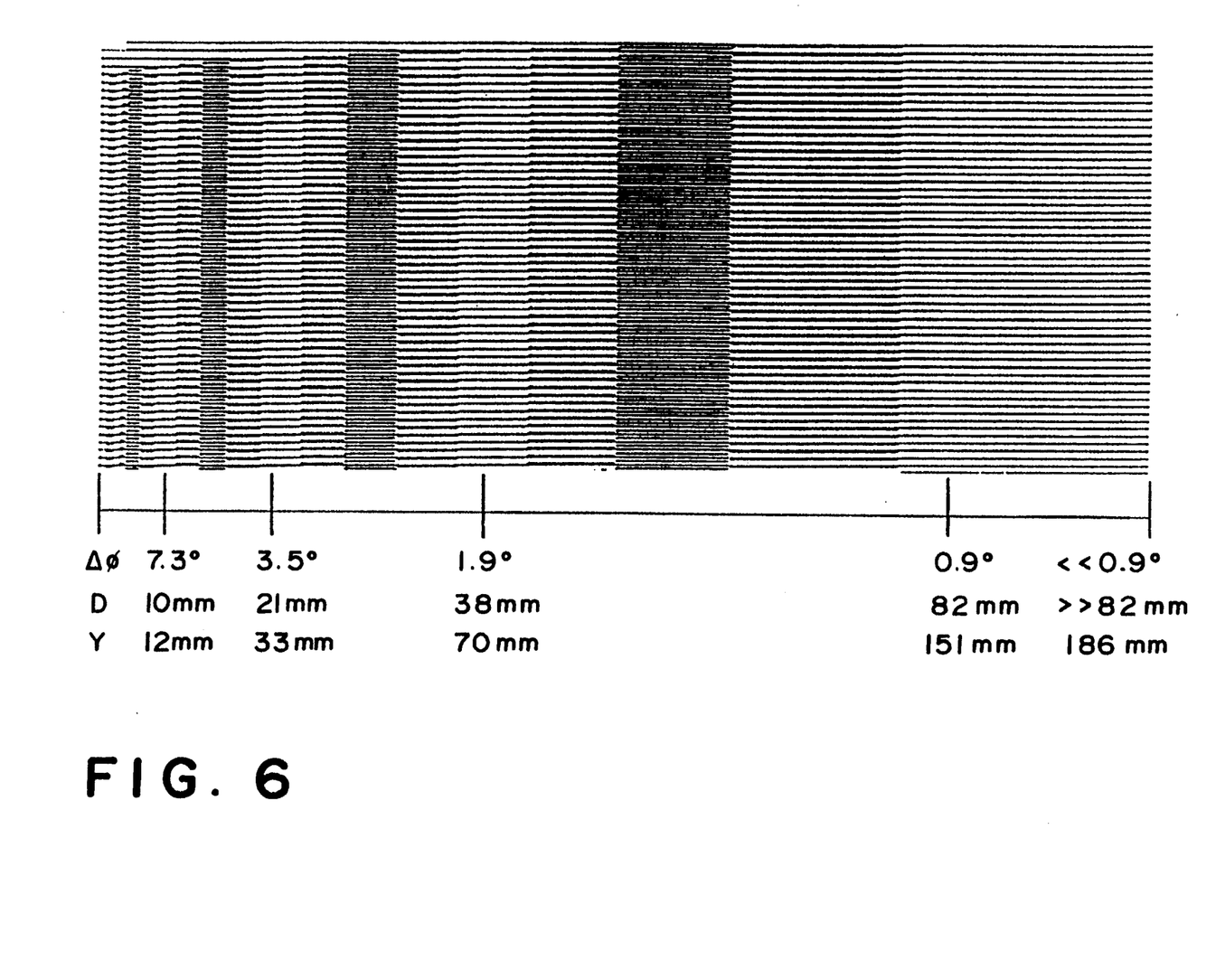
FIG. 6 is an illustration of the Moiré pattern resulting from superimposition of the patterns of FIGS. 4 and 5.

FIG. 6 shows the Moiré pattern obtained when the pseudo diffraction patterns of FIGS. 4 and 5 are combined. The fringe spacing D is relatively narrow on the left and gets larger as one moves to the fight, which shows that the curvature is greater at the edge of the field, on the left side, and reduces as we approach the reference.

Figure 7:
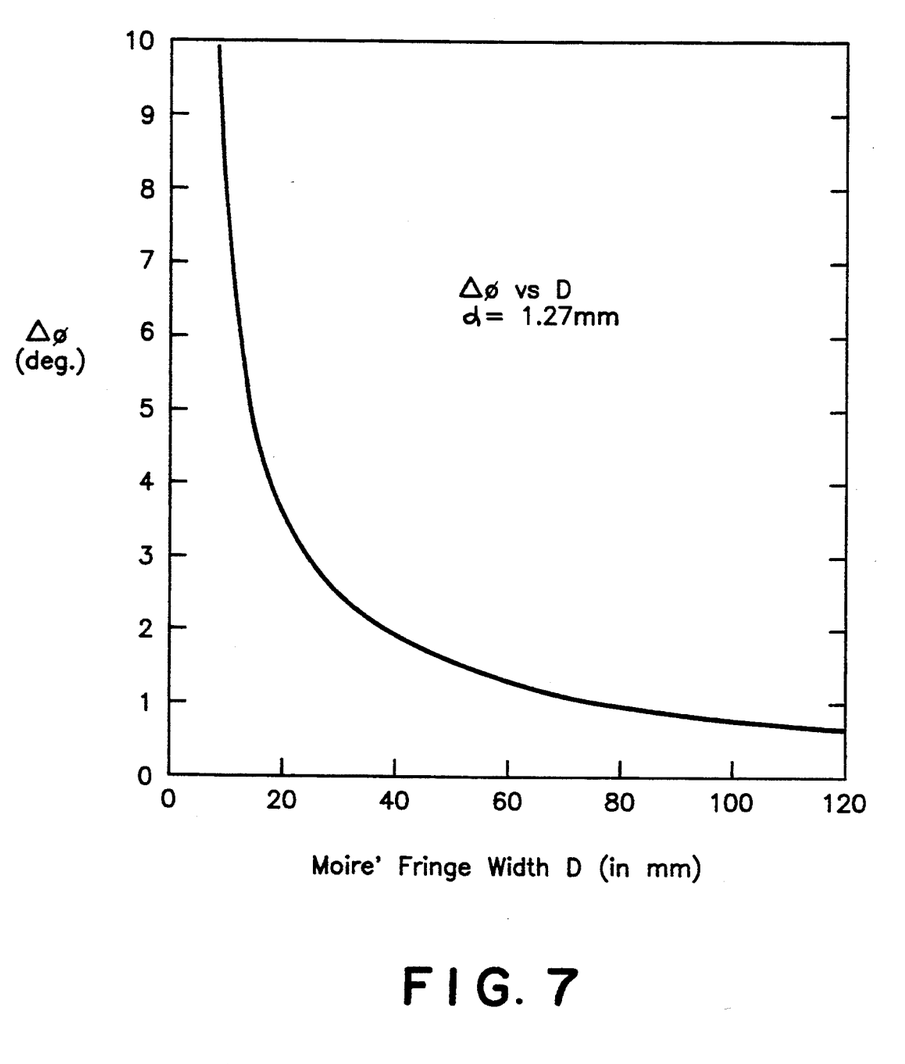
FIG. 7 is a graph illustrating the relationship between fringe spacing D and distortion angle $\Delta\phi$ for the Moiré pattern of FIG. 6.

Using equation 1, the angular deviation $\Delta\phi$ as a function of the Moiré fringe spacing D is plotted in FIG. 7 for a selected spacing of s=1.27 millimeters. These values for $\Delta\phi$ and D were taken from FIG. 6 and are also shown at the bottom of FIG. 6. As is apparent from FIG. 7, the replicated curved line of FIG. 5 starts with a $\Delta\phi$ of greater than or equal to 6.8° for D=10 millimeter and approaches the reference, $\Delta\phi=0$ with D>>80 millimeter. Measurements of the angular field distortion can thus be obtained for any region of the image field by appropriate selection of the Xt and Yt lines to be analyzed.

Illustrating the single test line approach described above, FIG. 8 is a basic operations diagram for producing a Moiré pattern measurement of angular distortion according to the preferred embodiment of the invention. At the input is the scene image containing the test and reference images, selection of which is made by the operator (blocks 10 and 11). The two lines are processed as required by first thresholding (thld) to remove unwanted background and then binarizing (bin) the image (block 12) to obtain a two state line video, on or off, for black or white with no gray scale. The line functions Xt, Yt and Xr, Yr are then replicated to form two pseudo edge diffraction patterns (blocks 13 and 14). Finally, the test and reference patterns are logically summed (block 15) to obtain a Moiré fringe pattern similar to that shown in FIG. 12, which then can be mapped for selected coordinates by measuring D, the distance between line crossings, s being known, to obtain $\Delta\phi$.

Figure 9:
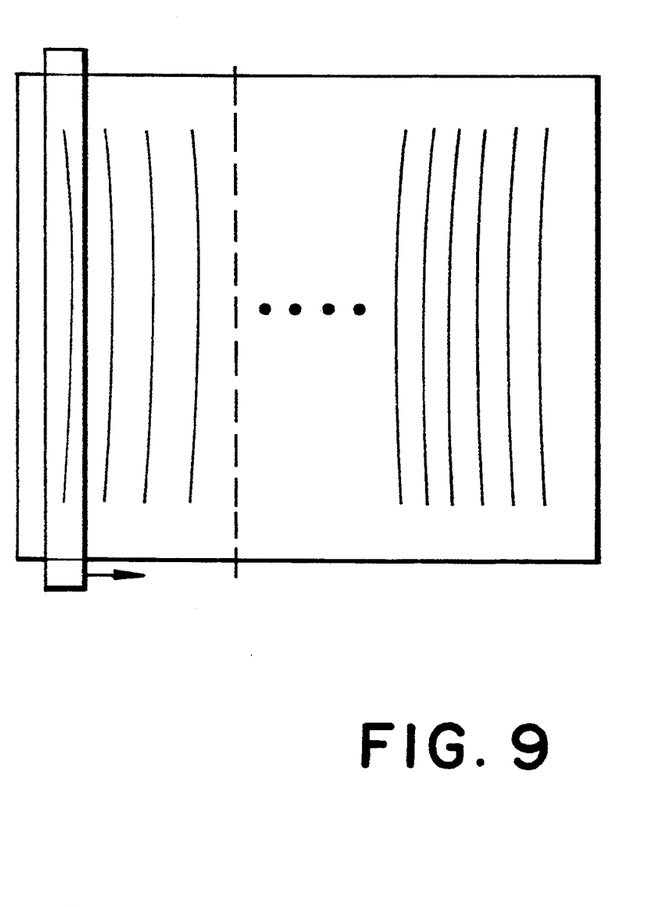
FIG. 9 is a schematic illustration of the manner in which distortion over a field is mapped by gating.

Automation is furthered by introducing a gating function, as shown in FIG. 9, which permits scanning of the field by incrementing the gate across the field, stopping at each line to sample the line, edge-transforming it, and summing it with the reference. The gate is then moved to the next line and the process repeated. This is until the entire region to be analyzed has been scanned and the angular deviations stored according to their position coordinates in the image plane. The data can then be printed as a distortion map of the imaging system.

It will of course be appreciated by those skilled in the art that the manner in which the reference pattern is created and the test pattern is processed may be varied by those skilled in the art within the scope of the invention, and that the above-description is intended to be exemplary and not limiting. The scope of the invention is intended to be defined solely by the appended claims.

I claim:

1. A method of measuring angular distortion in an optical imaging system having an image plane, comprising the steps of:
    a. using the imaging system to view a repetitive line pattern;
    b. converting said line pattern as viewed through the imaging system at the image plane;
    c. storing said electrical signals representative of the repetitive line pattern as viewed through the imaging system in a memory;
    d. generating a reference pattern consisting of electrical signals which represent the repetitive line pattern before viewing through the imaging system and superposing the reference pattern on said test pattern in order to obtain a Moire fringe pattern;
    e. selecting a test area of said superposed reference and test patterns and selecting a line spacing in said test area;
    f. counting a number of line crossings in said test area to obtain a Moire fringe spacing;
    g. calculating an angular deviation at said crossings; and
    h. storing electrical signals representing said angular deviation together with position coordinates thereof to thereby obtain a quantitative two-dimensional map of the distortions contributed by said imaging system over the image plane,
    and further comprising the steps of scanning the image by gating a single line in said repetitive line pattern and plotting the angular deviations for said line, said gating step being performed after steps a–c are performed and before steps d–h are performed, and incrementing said gate to another line in said repetitive line pattern before repeating steps d–h.

2. A method as claimed in claim 1, wherein said step g. comprises the step of applying the formula $$D=S/\phi$$

where D is the width of the Moiré fringe spacing, s is the line spacing, and $\phi$ is the angular deviation.

3. A method as claimed in claim 1, further comprising the step of displaying a map of the angular distortion by plotting values of the angular deviation versus the Moiré fringe pattern spacing.

4. A method as claimed in claim 1, wherein step d. comprises the steps of replicating the gated line in said repetitive line pattern and a respectively selected reference line corresponding to the gated line; and summing the electrical signals representing the respective replicated lines to obtain said Moiré fringe pattern.

5. A method as claimed in claim 4, wherein said steps of replicating the gated and reference lines comprises the step of forming an edge transformed diffraction pattern for each of said reference and gated lines.

6. A method as claimed in claim 5, wherein said forming step comprises the steps of thresholding and binarizing the respective reference and gates lines.

7. Apparatus for measuring angular distortion in an optical imaging system having an image plane, comprising:

means for using the imaging system to view a repetitive line pattern;

means for converting said line pattern as viewed through the imaging system at the image plane;

means for storing said electrical signals representative of the repetitive line pattern as viewed through the imaging system in a memory;

means for generating a reference pattern consisting of electrical signals which represent the repetitive line pattern before viewing through the imaging system and superposing the reference pattern on said test pattern in order to obtain a Moire fringe pattern;

means for selecting a test area of said superposed reference and test patterns;

means for counting a number of line crossings in said test area to obtain a Moire fringe spacing;

means for calculating an angular deviation at said crossings;

means for storing electrical signals representing said angular deviation together with position coordinates thereof to thereby obtain a quantitative two-dimensional map of the distortions contributed by said imaging system over the image plane, means for scanning the image by gating a single line in said repetitive line pattern and plotting the angular deviation for said line; and means for incrementing said line to another line in said repetitive line pattern before generating a reference pattern.

8. Apparatus as claimed in claim 7, wherein said means for calculating comprises means for applying the formula $$D = S/\phi$$

where D is the width of the Moiré fringe spacing, s is the line spacing, and $\phi$ is the angular deviation.

9. Apparatus as claimed in claim 7, further comprising means for displaying a map of the angular distortion by plotting values of the angular deviation versus the Moiré fringe pattern spacing.

10. Apparatus as claimed in claim 7, wherein said means for superposing comprises means for replicating the gated line in said repetitive line pattern and a respectively selected reference line corresponding to the gated line; and summing the electrical signals representing the respective replicated lines to obtain said Moiré fringe pattern.

11. Apparatus as claimed in claim 10, wherein said means for replicating the gated and reference lines comprises means for forming an edge transformed diffraction pattern for each of said reference and gated lines.

12. Apparatus as claimed in claim 11, wherein said means for forming an edge transformed diffraction pattern comprises means for thresholding and binarizing the respective reference and gated lines.

* * * * *